US012338978B1

(12) United States Patent
Whittaker et al.

(10) Patent No.: US 12,338,978 B1
(45) Date of Patent: Jun. 24, 2025

(54) TRACK LIGHTING SYSTEM AND LUMINAIRE WITH MULTIPLE LEDs

(71) Applicant: Illumination Enterprises Inc., West Jordan, UT (US)

(72) Inventors: Ryan Whittaker, West Jordan, UT (US); Jason Lee, West Jordan, UT (US)

(73) Assignee: Illumination Enterprises Inc., West Jordan, UT (US)

( * ) Notice: Subject to any disclaimer, the term of this patent is extended or adjusted under 35 U.S.C. 154(b) by 0 days.

(21) Appl. No.: 18/637,447

(22) Filed: Apr. 16, 2024

(51) Int. Cl.

| | |
|---|---|
| ***F21V 23/00*** | (2015.01) |
| ***F21S 4/10*** | (2016.01) |
| ***F21S 4/20*** | (2016.01) |
| ***F21S 4/28*** | (2016.01) |
| ***F21V 3/06*** | (2018.01) |
| ***F21V 17/16*** | (2006.01) |
| ***F21V 19/00*** | (2006.01) |
| ***F21V 21/005*** | (2006.01) |

(Continued)

(52) U.S. Cl.
CPC .............. *F21V 21/008* (2013.01); *F21S 4/10* (2016.01); *F21S 4/20* (2016.01); *F21S 4/28* (2016.01); *F21V 3/062* (2018.02); *F21V 17/164* (2013.01); *F21V 19/002* (2013.01); *F21V 21/005* (2013.01); *F21V 23/005* (2013.01); *F21V 29/70* (2015.01); *F21Y 2113/13* (2016.08); *F21Y 2115/10* (2016.08)

(58) Field of Classification Search
CPC ...... F21V 21/008; F21V 3/062; F21V 17/164; F21V 23/005; F21V 29/70; F21V 19/002; F21V 21/005; F21S 4/10; F21S 4/20; F21S 4/28; F21Y 2113/13; F21Y 2115/10
See application file for complete search history.

(56) References Cited

U.S. PATENT DOCUMENTS 5,175,961 A * 1/1993 Bolton .................... B24B 13/00
451/163
5,833,332 A 11/1998 Marshall et al.
(Continued)

FOREIGN PATENT DOCUMENTS

JP H06188576 A * 7/1994
JP 3173044 U * 1/2012

*Primary Examiner* — Zheng Song
*Assistant Examiner* — Glenn D Zimmerman
(74) *Attorney, Agent, or Firm* — Dentons Durham Jone Pinegar; Sarah W. Matthews; Lilly Godfrey

(57) ABSTRACT

This disclosure relates to track lighting systems that can be permanently installed and luminaires having multiple LEDs to be used with the track lighting system. In various aspects, a luminaire includes a housing having a body which defines a recess having a ledge. The luminaire also includes a lens continuous with the body and extending away from the body. Additionally, the luminaire includes a circuit board housed within the recess, where the circuit board has a cluster of light-emitting diodes (LEDs) including three (3) LEDs disposed in an equilateral triangle on a front surface of the circuit board. The circuit board also a controller for controlling the cluster of LEDs and receiving instructions from an instructor. The circuit board abuts the ledge of the recess such that the cluster of LEDs are oriented towards the lens and emit light from the lens when the cluster of LEDs are powered.

12 Claims, 11 Drawing Sheets

(51) Int. Cl.

| | |
|---|---|
| ***F21V 21/008*** | (2006.01) |
| ***F21V 29/70*** | (2015.01) |
| ***F21Y 113/13*** | (2016.01) |
| ***F21Y 115/10*** | (2016.01) |

(56) References Cited

U.S. PATENT DOCUMENTS

| | | | | |
|---|---|---|---|---|
| 7,344,265 | B1 | 3/2008 | Tieken | |
| 7,347,606 | B1 * | 3/2008 | Patten | F21V 15/04 362/217.05 |
| 8,926,118 | B1 | 1/2015 | Whittaker | |
| 10,411,173 | B2 * | 9/2019 | Aruga | H01L 33/58 |
| 2004/0105255 | A1 | 6/2004 | Seeburger | |
| 2004/0110279 | A1 * | 6/2004 | Everett | C12M 23/12 435/286.2 |
| 2004/0189218 | A1 * | 9/2004 | Leong | H05B 45/3578 315/291 |
| 2007/0008734 | A1 * | 1/2007 | Bogner | F21S 41/28 257/E33.071 |
| 2007/0291491 | A1 * | 12/2007 | Li | G03B 21/208 362/307 |
| 2011/0141734 | A1 * | 6/2011 | Li | G02B 19/0028 362/335 |
| 2012/0206909 | A1 * | 8/2012 | Morgan | F21K 9/20 29/829 |
| 2013/0107521 | A1 * | 5/2013 | Hisayasu | F21K 9/23 362/235 |
| 2014/0071675 | A1 * | 3/2014 | Chang | G02B 19/0071 362/240 |
| 2020/0198530 | A1 * | 6/2020 | Hellin_Navarro | B60Q 1/2696 |
| 2022/0003383 | A1 * | 1/2022 | Zhang | F21V 31/04 |
| 2024/0247770 | A1 * | 7/2024 | Sanichar | F21V 29/70 |

* cited by examiner

300

TRACK LIGHTING SYSTEM AND LUMINAIRE WITH MULTIPLE LEDs

TECHNICAL FIELD

This disclosure relates generally to lighting for residential buildings. More specifically, this disclosure relates to track lighting systems that can be permanently installed and luminaires having multiple light-emitting diodes (LEDs), such as 3 LEDs, to be used with the track lighting system.

SUMMARY

Disclosed are systems, devices, and/or methods of use thereof regarding track lighting systems that can be permanently installed and luminaires having multiple LEDs (such as 3 LEDs or more) to be used with the track lighting system. In various aspects, a luminaire includes a housing having a body which defines a recess having a ledge. The luminaire also includes a lens continuous with the body and extending away from the body. Additionally, the luminaire includes a printed circuit board (PCB) housed within the recess, where the PCB has a cluster of light-emitting diodes (LEDs) including three (3) LEDs disposed in an equilateral triangle on a front surface of the PCB. The PCB also a controller for controlling the cluster of LEDs and receiving instructions from an instructor. When the PCB is housed within the recess, the PCB abuts the ledge of the recess such that the cluster of LEDs are oriented towards the lens and emit light from the lens when the cluster of LEDs are powered.

In various aspects, a housing for a light includes a hollow body having a recess, a first tab extending from a first end of the hollow body, and a second tab extending from a second, opposing end of the hollow body. The housing also includes a lightpipe extending from a top surface of the hollow body and in light communication with the recess and a lens extending from the lightpipe along a longitudinal axis of the lightpipe. The hollow body receives a printed circuit board (PCB) having a group of light emitting diodes (LEDs), such that light emitted from the LEDs travels through the lightpipe, into the lens, and exits the lens such that light emitting through the lens has a diffused look.

In various aspects, a method of retrofitting lights within a track lighting system includes assembling a luminaire device comprising a housing and 3 LEDs mounted to a circuit board contained within the housing and stringing a plurality of luminaire devices along a cable to form a string of lights. The method additionally includes removing an installed light string from the track lighting system without removing the track lighting system and positioning the string of lights within the track lighting system. The method further includes snapping a lens of each luminaire device through a corresponding aperture of the track lighting system, where the housing of each luminaire device remains fully contained within the track lighting system.

Other aspects of the disclosed subject matter, as well as features and advantages of various aspects of the disclosed subject matter, should be apparent to those of ordinary skill in the art through consideration of the ensuing description, the accompanying drawings, and the appended claims.

DETAILED DESCRIPTION

Figure 1:
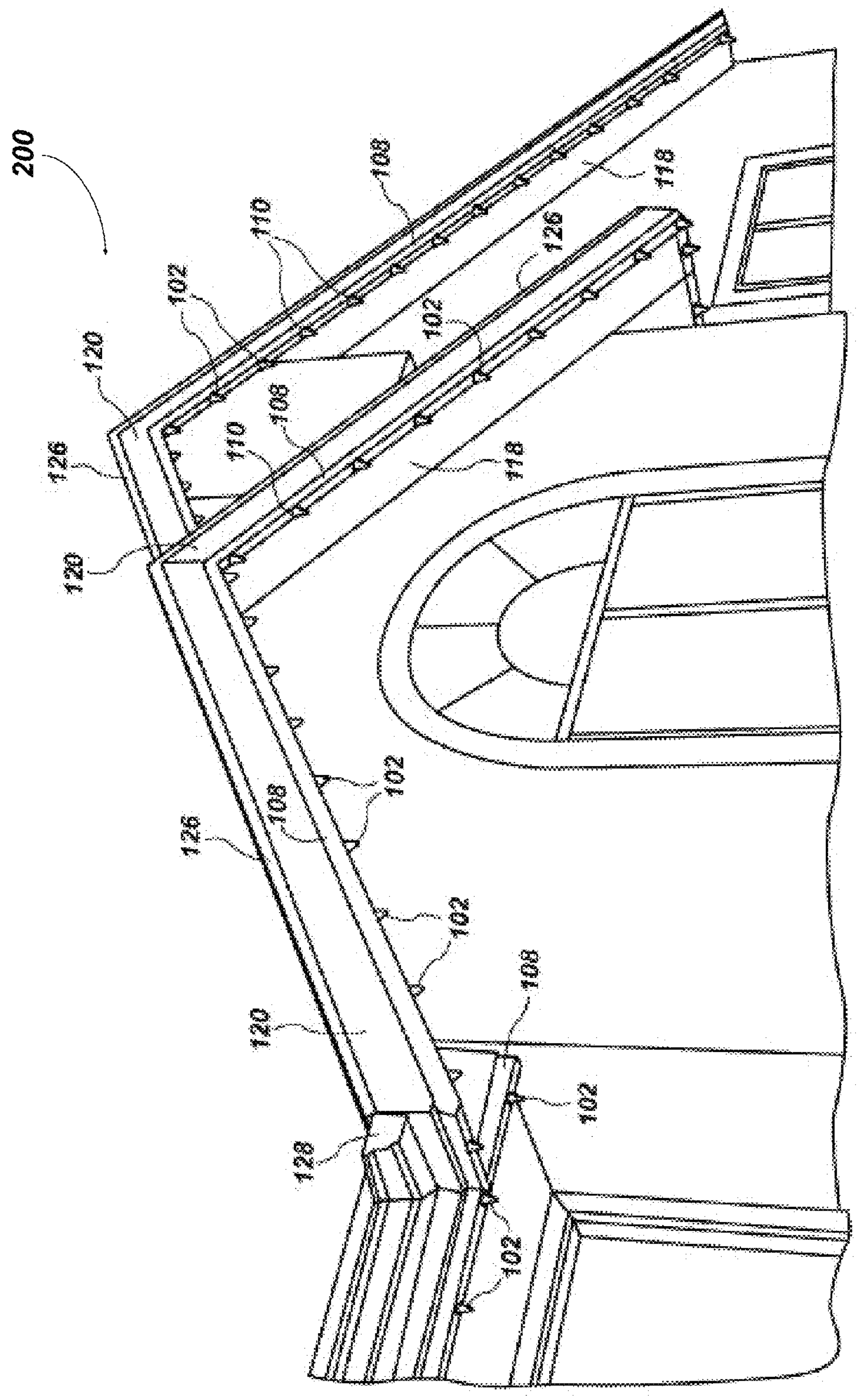
FIG. 1 illustrates a track lighting system installed on a residential structure.

String lights are used to decorate numerous structures on a variety of occasions. For example, the exteriors of commercial buildings and homes are lined with lights at Christmas. String lights are also becoming increasingly popular Halloween, Thanksgiving, and Independence Day home decorations. They are also employed for summer outdoor entertaining, weddings, and countless other occasions.

Mounting string lights on structures can be challenging in terms of hanging them straight and evenly. Installing and removing string lights can also damage the structure to which they are affixed. For example, attaching the string lights often requires the use of nails, staples or other similar fastening mechanisms which can, with repeated use, cause significant damage to the structure exterior (e.g., the soffits and/or fascia to which the string lights are anchored). It also creates unsightly holes upon removal which can diminish property value. The use of current fastening mechanisms also makes removal of string lights extremely difficult. The fasteners must be individually removed; or in some cases, the lights are simply pulled down, dragging the fasteners with them, which makes the lights and the structures much more prone to damage. Additionally, most temporary fastening systems are made out of weak plastic that becomes brittle over a short time due to exposure to ultra violet rays and weather conditions.

Repeated installation and removal of string lights can be dangerous as installers are often perched precariously on ladders, frequently in icy or other undesirable conditions. Mounting string lights on a roofline or against a rain gutter system-which is often where such lights are installed—also exposes the electrical wiring and bulb to harmful weather and ultraviolet damage.

Additionally, current string lights for residential structures are often limited in the strength of light (e.g., lumens) that can be emitted from the string lights. Specifically, residential string lights tend to incorporate fewer light-emitting elements, such as light-emitting diodes (LEDs). While this may be desirable when a soft light is preferred, often a greater amount of light emitted is desired. Further, string lights incorporating LEDs tend to flicker or emit pixelated light, rather than creating an overall diffuse, glowing, and cohesive lighting effect.

Disclosed are systems, devices, and/or methods of use thereof regarding track lighting systems that can be permanently installed and luminaire devices having 3 LEDs to be used with the track lighting system. In various aspects, a luminaire includes a housing having a body which defines a recess having a ledge. The luminaire also includes a lens continuous with the body and extending away from the body. Additionally, the luminaire includes a printed circuit board (PCB) housed within the recess, where the PCB has a cluster of light-emitting diodes (LEDs) including three (3) LEDs disposed in an equilateral triangle on a front surface of the PCB. The PCB also a controller for controlling the cluster of LEDs and receiving instructions from an instructor. When the PCB is housed within the recess, the PCB abuts the ledge of the recess such that the cluster of LEDs are oriented towards the lens and emit light from the lens when the cluster of LEDs are powered.

In various aspects, a housing for a light includes a hollow body having a recess, a first tab extending from a first end of the hollow body, and a second tab extending from a second, opposing end of the hollow body. The housing also includes a lightpipe extending from a top surface of the hollow body and in light communication with the recess and a lens extending from the lightpipe along a longitudinal axis of the lightpipe. The hollow body receives a printed circuit board (PCB) having a group of light emitting diodes (LEDs), such that light emitted from the LEDs travels through the lightpipe, into the lens, and exits the lens such that light emitting through the lens appears to glow.

In various aspects, a method of retrofitting lights within a track lighting system includes assembling a luminaire device comprising a housing and 3 LEDs mounted to a circuit board contained within the housing and stringing a plurality of luminaire devices along a cable to form a string of lights. The method additionally includes removing an installed light string from the track lighting system without removing the track lighting system and positioning the string of lights within the track lighting system. The method further includes snapping a lens of each luminaire device through a corresponding aperture of the track lighting system, where the housing of each luminaire device remains fully contained within the track lighting system.

FIG. 1 illustrates a track lighting system 200 installed on a residential structure, such as a house. Specifically, the track lighting system 200 includes a channel 108 for receiving a string of lights or luminaires, such as a plurality of luminaires 100. The channel 108 includes a plurality of openings or apertures 110 through which a portion 102 of the luminaire 100 may extend or protrude. Each opening or aperture 110 may have a diameter of about 12 mm to about 13 mm, where the diameter of the aperture 110 corresponds to a diameter of the portion 102 of the luminaire 100 extending through the aperture 110. The channel 108 may be mounted to or otherwise secured against the soffit 118 of the residential structure. Additionally, and/or alternatively, the channel 108 may be mounted to the residential structure by securing a portion of the channel 108 underneath fascia 120 of the structure. When installed along a residential structure, such as a house, the channel 108 does not interfere with guttering 128 or flashing 126.

When the track lighting system 200 is installed on a house or other residential structure, light emitted from the track lighting system 200 creates a substantially solid beam against the house. This beam is continuous, uniform, and does not create a wavy, prismatic, or otherwise undesirable appearance against the house. Additionally, light emitted from the track lighting system 200 is diffuse and appears to glow, instead of having a pixelated or prism effect, which can be common when using LEDs. That is, the light mean is blurred or diffused and has a more consistent gradient or more even light spread from the center to the edges of the beam.

Figure 2:
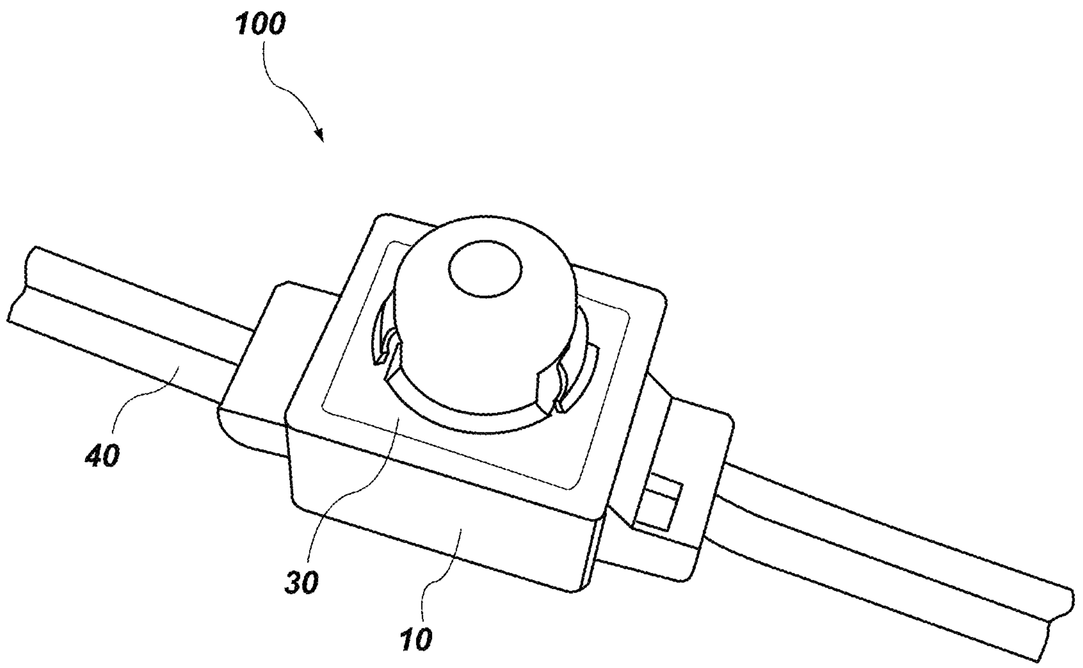
FIG. 2 illustrates a luminaire for use in track lighting systems, such as the track lighting system illustrated in FIG. 1.

FIG. 2 illustrates a luminaire 100 for use in track lighting systems, such as the track lighting system illustrated in FIG. 1. The luminaire 100 includes a housing 10 for receiving a circuit board 30, which includes one or more surface mounted diodes, such as light-emitting diodes (LEDs). Notably, the housing 10 is of a small size (e.g., a total width of around 18 mm, a total height of around 24 mm, and a length of around 35 m mm) while still containing more than one LED, such that the luminaire 100 is capable of emitting commercial grade brightness while remaining compact. The housing 10 may be strung along a cable 40 and multiple luminaires 100 may be strung along the cable 40 to form a string of lights. The string of lights may be positioned within the track lighting system 200 of FIG. 1. The housing 10 may be contained within the channel 108, while a lens 20 (e.g., the portion 102 of the luminaire 100) may extend through the apertures 110. The cable 40 may be secured under an angled overhang of the channel 108.

FIGS. 3A through 6 illustrate various views of a housing 10 for the luminaire 100 of FIG. 2. The housing 10 includes a body 11 having a first end 11*a*, a second opposing end 11*b*, a top surface 11*c*, a first side 11*d*, a second opposing side 11*e*, and a bottom 11*f*. Extending from and continuous with the first end 11*a* is a first tab 12*a*; extending from and continuous with the second end 11*b* is a second tab 12*b*. Each of the first and second tabs 12*a*, 12*b* may include a ramped portion 13*r* continuous with the body 11 and a winged portion 13*w* that extends away from the body 11. The winged portion 13*w* may define a void 14, which contributes to the functionality of the clip 16*b* on the underside of the body 11 (see FIG. 4). The tabs 12*a*, 12*b* facilitate stringing or chaining the housing 10 along a cable or other string (e.g., during installation of multiple housings 10 within the track lighting system 200 of FIG. 1). For example, referring to FIG. 4, each tab 12*a*, 12*b* includes a channel 15 and a clip 16, aligned with the voids 14, on an underside of the tab 12*a*, 12*b*. A cable or other string may be fed or otherwise guided through a first channel 15*a*, across the recess 17, and through the second, opposing channel 15*b*. The cable may be secured within each channel 15*a*, 15*b* by the clips 16. The cable may carry a circuit board 30 and LEDs 33 (see FIGS. 7A through 9), such that the LEDs 33 may be positioned within the recess 17 to emit light through the lens 20.

Figure 5A:
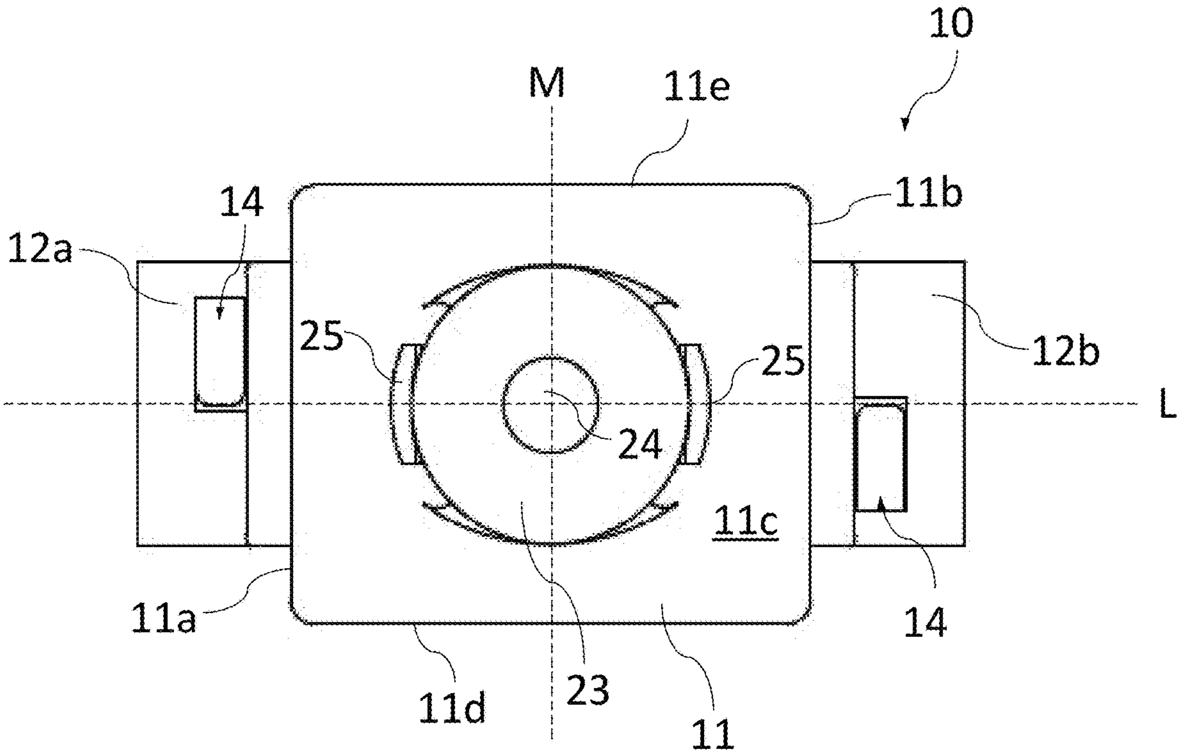
FIG. 5A illustrates a top view and FIG. 5B illustrates a bottom view of the housing of FIGS. 3A and 3B.
Figure 5B:
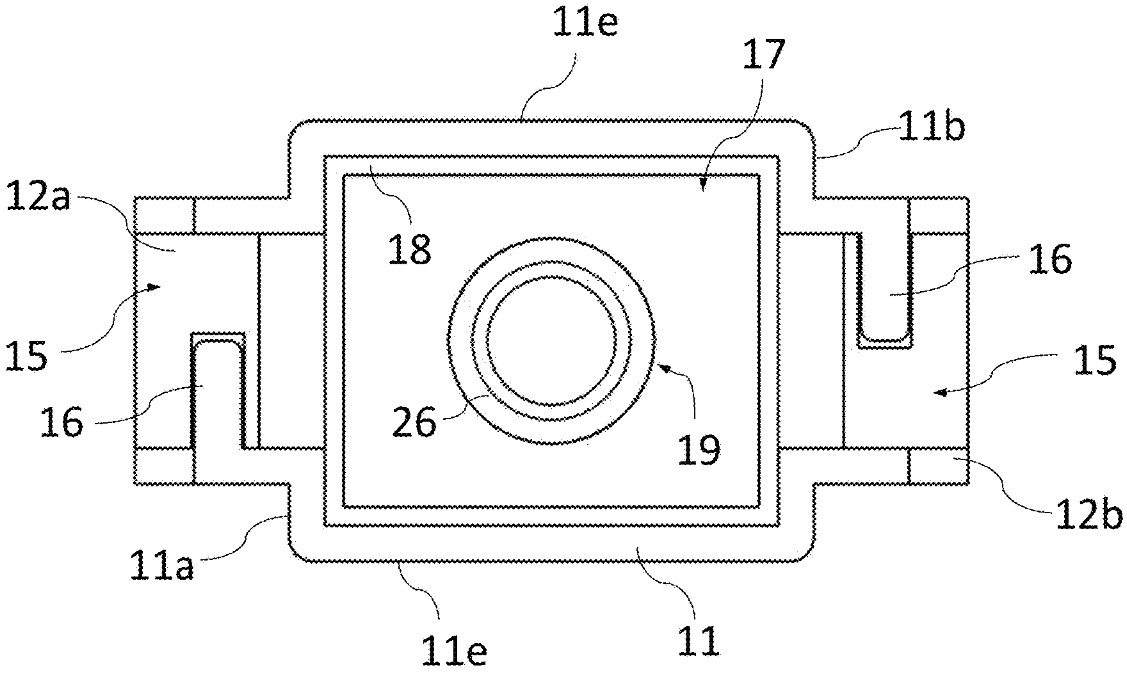

As best seen in FIGS. 5A and 5B, the housing 10 is substantially symmetrical along both a longitudinal axis L and a minor axis M of the housing 10. That is, the first and second tabs 12*a*, 12*b* are mirror images of each other but otherwise the housing 10 is symmetrical along both axes L, M. The housing 10 has a width from the first side 11*d* to the second side 11*e* of about 18.5 mm, such as a width of about 16, 17, 18, 19, 20, 20.5 mm, or a width within a range defined by any two of the foregoing values. A width of each tab 12*a*, 12*b* may range from about 10 mm to about 14 mm, such as 11, 12, 13, 13.5 mm, or a width within a range defined by any two of the foregoing values. A length of the housing 10, from the first tab 12*a* to the second tab 12*b*, may range from about 32 mm to about 37 mm, such as 33, 34, 34.5, 35, 35.5, 36 mm, or a length within a range defined by any two of the foregoing values. A height of the body 11, extending from the bottom 11*f* to the to surface 11*c*, may range from about 10 mm to about 15 mm, such as 11, 12, 12.5, 13, 13.5, 13, 14.5 mm, or a height within a range defined by any two of the foregoing values. A height of the winged portion 13*w* may range from about 3 mm to about 5 mm, such as 4, 4.5 mm, or a height within a range defined by any two of the foregoing values.

Extending from and continuous with the top surface 11*c* is a lens 20. The lens 20 includes a lightpipe 21 and a dome 23 having a substantially flat or planar apex 24. The dome 23 may be arranged over and aligned with the lightpipe 21, and may be wider than the lightpipe 21, having a diameter greater than that of the lightpipe 21. For example, the dome 23 may have a diameter of about 10 to 13 mm, such as 11, 11.7, 11.77, 12 mm, or a diameter within a range defined by any two of the foregoing values.

The dome 23 may include a roughened surface finish or textured finish on an exterior of the dome 23. For example, the dome 23 may include a roughened surface finish having a roughness or abrasion ranging from Society of the Plastic Industry (SPI) D1 to SPI D3. The SPI finish refers to the American surface finish standard set by SPI. The standard covers 12 SPI grades of polish finishes: SPI A1 to #SPI D3 (RA 0.012 μm to RA 18.00 μm). SPI D1 to SPI D3 includes from a satin texture finish, to a dull texture finish, to a rough textured finish. The roughened surface finish and the overall shape of the dome 23 may create a diffuse or glowing effect of light emitted from the lens 20 (e.g., from the dome 23 and the apex 24). The roughened surface finish may also facilitate emission of light in multiple directions from the lens 20, thus avoiding a pixelated effect of the emitted light. For example, the roughened surface finish may facilitate emission of light in approximately 180°.

The substantially flat or planar apex 24 also facilitates a uniform and diffuse emission of light through the lens 20 and/or the dome 23. Specifically, the apex 24 may assist in directing light back into the dome 23 and/or the lightpipe 21, such that light is predominantly emitted from sides of the lens 20 (e.g., the dome 23, the sides 22 of the lightpipe 21, etc.). The apex 24 may allow light emitted from LEDs through the lens 20 to "backsplash" into the lens 20, such that the light emitted from the lens is diffuse and glows, rather than being emitted in a prism/beam fashion. Additionally, the apex 24 together with the dome 23 may direct light emitted from the lens 20 downward, such as towards a house or other structure, to avoid a prism effect of the emitted light on the house or other structure.

The lightpipe 21 may be substantially cuboid (e.g., substantially a cube, a rectangular prism, etc.) having angled or curved sides 22. More specifically, the lightpipe 21 may be a substantially solid cuboid structure having a polished surface finish. In some embodiments, interior portions of the lightpipe 21 may be hollowed out to prevent warping of the lightpipe 21 during manufacture of the housing 10. The polished surface finish allows light emitted into the lightpipe 21 to travel and reflect through the lightpipe 21 and around edges of the lightpipe 21 (e.g., around the sides 22) and be directed to the dome of the lens. This reflecting of light within and through the lightpipe 21 also facilitates an emanating, glowing effect of the light emitted from the lens, again avoiding a prism and/or beam effect of the light.

A height of the housing 10, extending from the bottom 11*f* to the apex 24, may range from about 20 mm to about 26 mm, such as 21, 22, 23, 23.5, 24, 25 mm, or a height within a range defined by any two of the foregoing values. A height of the lens, extending from the top surface 11*c* to the apex 24, may range from about 9 to about 13 mm, such as 10, 11, 12 mm, or a height within a range defined by any two of the foregoing values. A height of the lightpipe 21, extending from the top surface 11*c* to the dome 23, may range from about 4 mm to about 8 mm, such as 5, 6, 6.5, 7 mm, or a height within a range defined by any two of the foregoing values. A height of the dome 23, extending from a bottom 23*b* of the dome 23 to the apex 24, may range from about 3 mm to about 7 mm, such as 4, 4.5, 4.99, 5, 6 mm, or a height within a range defined by any two of the foregoing values.

Figure 3A:
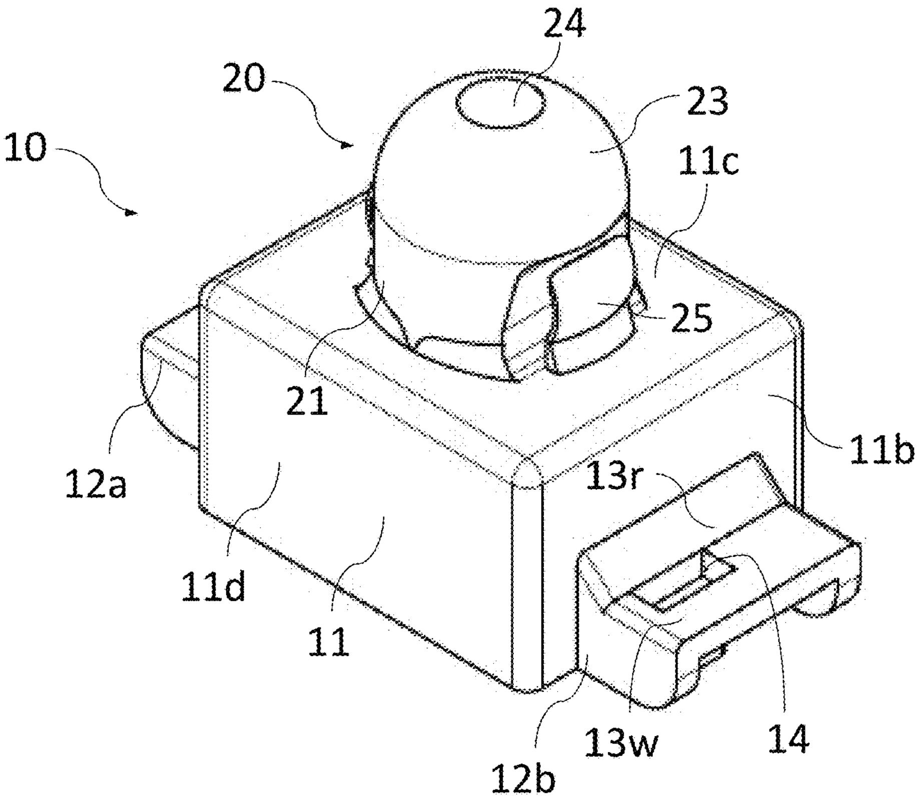
FIGS. 3A and 3B illustrate perspective views of a housing for the luminaire of FIG. 2.
Figure 3B:
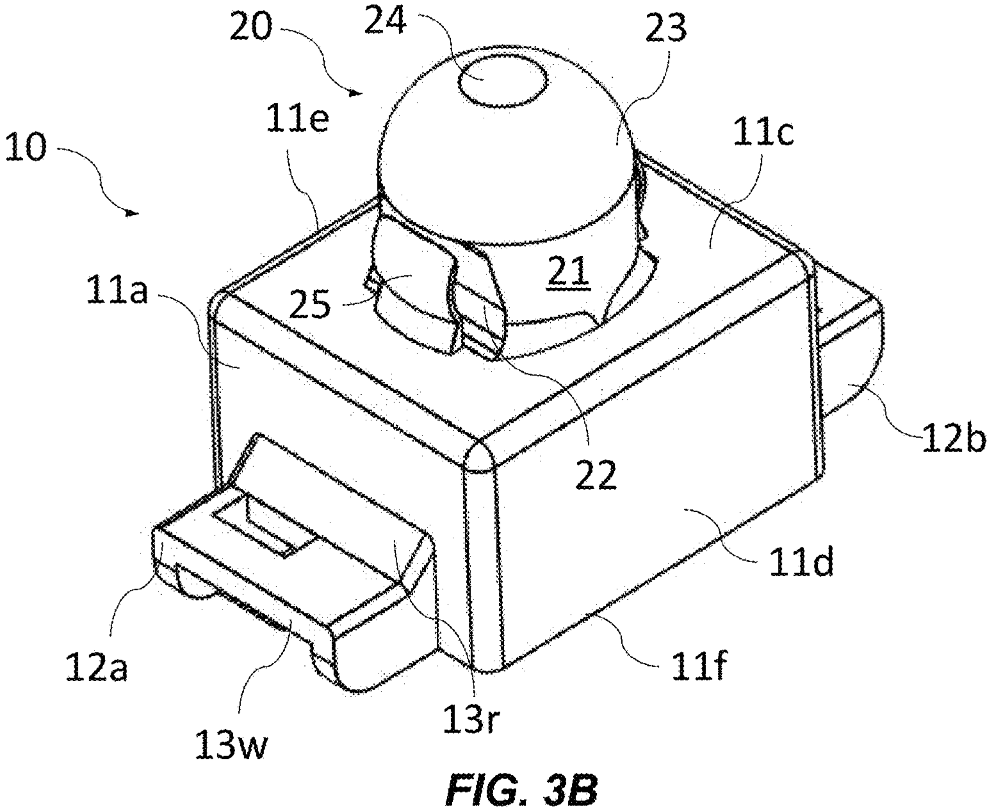

The lens 20 additionally includes clips or wings 25 flanking the lightpipe 21 (and/or the sides 22 of the lightpipe 21). The wings 25 have a degree of flexibility that allows the wings 25 to be pushed or compressed in toward the lightpipe 21 and then spring back to an initial position (i.e. the biased position). The initial position is illustrated in FIGS. 3A and 3B. For example, as discussed elsewhere, the wings 25 may facilitate anchoring or securing the lens 20 and/or the luminaire 100 within the track lighting system of FIG. 1. Specifically, the wings 25 may facilitate anchoring the lens 20 within an aperture 110 of the track lighting system, such that the wings 25 and the lens 20 extend through the aperture while the body 11 remains contained within the channel 108 of the track lighting system 200.

Figure 4:
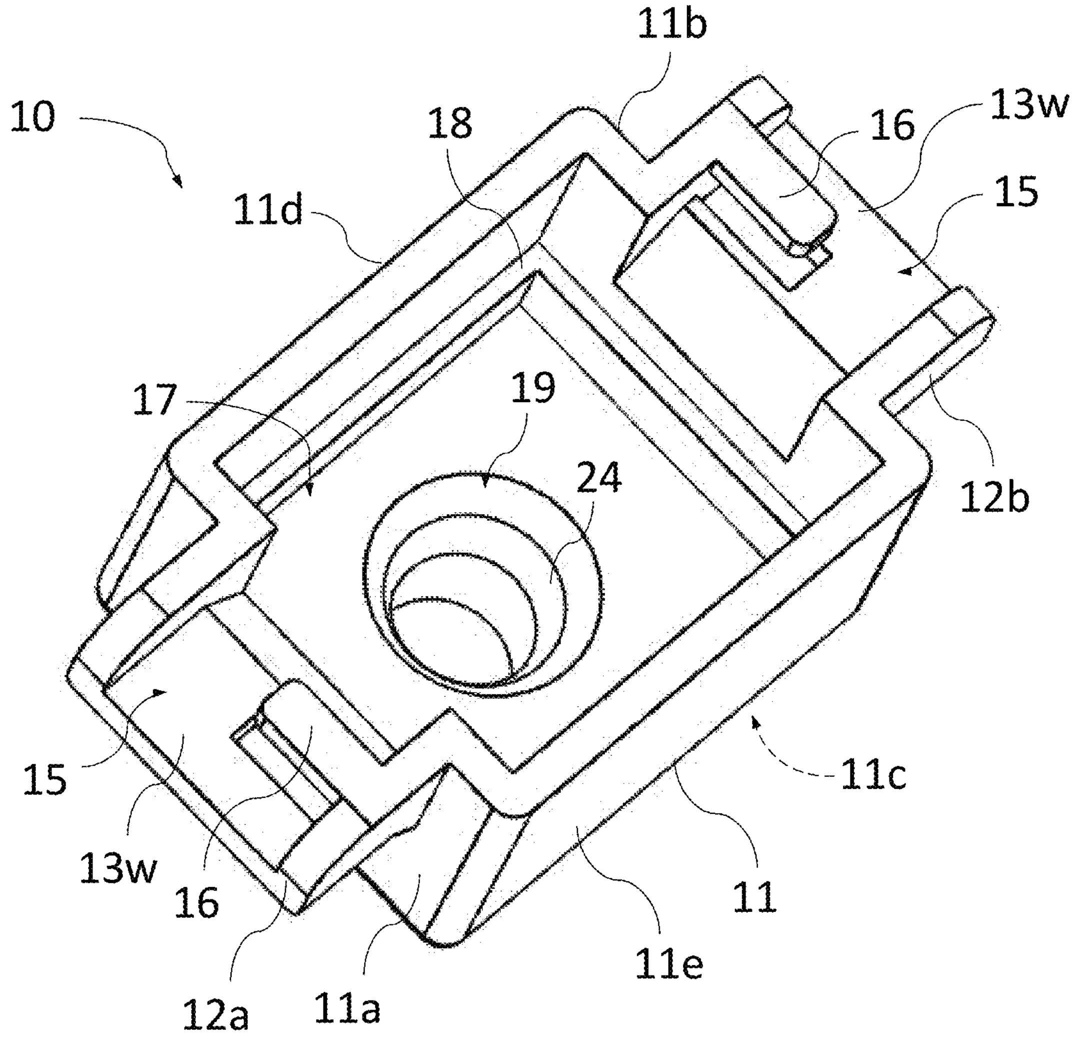
FIG. 4 illustrates a bottom, perspective view of the housing of FIGS. 3A and 3B.
Figure 6:
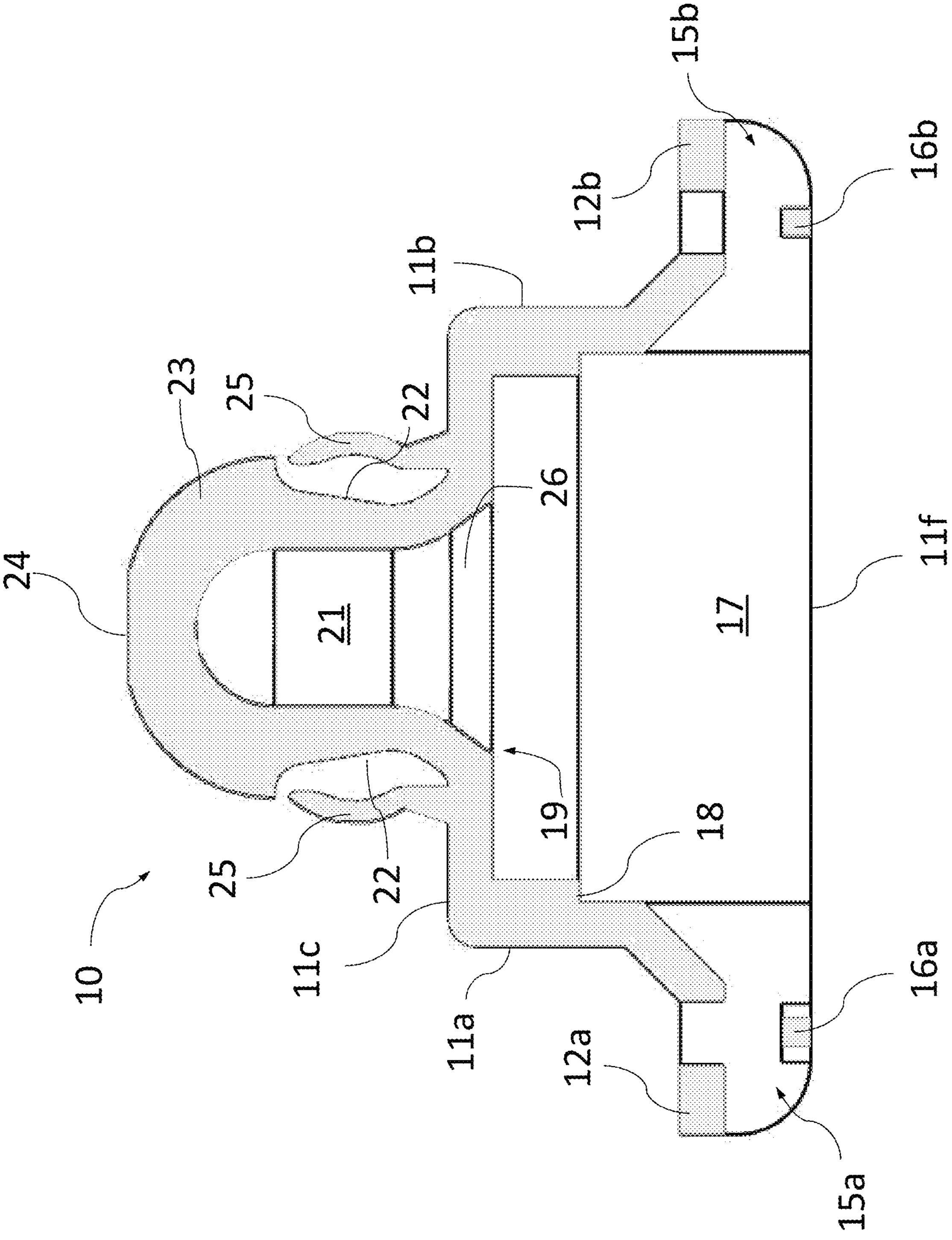
FIG. 6 illustrates a cross-sectional view of the housing through a longitudinal axis of the housing.

As best seen in FIGS. 4 and 6, the body 11 defines a recess 17 at the bottom 11*f* of the body 11, on an opposing side of the top surface 11*c*. The recess 17 is for receiving and housing a circuit board 30 (see FIGS. 6A and 6B) bearing light-emitting diodes (LEDs). The recess 17 includes a ledge 18 against which the circuit board 30 will abut when the circuit board 30 is positioned and housed within the recess 17. Additionally, the recess 17 includes a "window" 19, placing the recess 17 in light communication with the lens 20 (e.g., the lightpipe 21 and the dome 23). The lightpipe 21 includes a base 26, where the lightpipe 21 opens into the recess 17 at the window 19. The base 26 of the lightpipe 21 may be continuous with the window 19 and the top surface 11*c* of the body 11. Alternatively, the window 19 may be defined by an underside of the top surface 11*c* of the body 11 and receive the base 26 of the lightpipe 21. The circuit board 30 may be oriented within the recess 17 such that LEDs mounted on the circuit board 30 are oriented towards the window 19 and, thus, lightpipe 21.

As best seen in FIG. 6, the recess 17 of the housing 10 is continuous with channels 15*a*, 15*b* defined by the first and second tabs 12*a*, 12*b*, respectively. The channels 15*a*, 15*b* facilitate the threading or stringing of the housing 10 along a cable (such as cable 40 from FIG. 2). The tabs 12*a*, 12*b* each include a clip 16*a*, 16*b* for securing the housing 10 along the cable 40. The cable 40 may carry or otherwise be connected to the circuit board 30, thereby powering the circuit board 30 (and any LEDs mounted on the circuit board 30) as well as facilitating a plurality of housings 10 (and/or luminaires 100) to be strung along the cable 40, forming a string of lights.

As the recess 17 is continuous with the channels 15*a*, 15*b* of each tab 12*a*, 12*b*, the circuit board 30 and the cable 40 may both be positioned within the recess 17. The circuit board 30 can be positioned such that the cluster of LEDs 35 are oriented and directly aligned with a longitudinal axis of the lightpipe 21. The cable 40 may be strung through the channels 15*a*, 15*b* of the tabs 12*a*, 12*b* and secured in position by the clips 16*a*, 16*b*. The resulting luminaire 100 is secure enough to be positioned and installed within a track lighting system, such as track lighting system 200 of FIG. 1.

The housing 10 may be formed as a single, uniform, and unitary piece such that each component of the housing 10 is continuous or substantially continuous with the body 11. For example, the housing 10 may be formed through an injection molding process with, for example, polycarbonate, acrylic, or another appropriate material for molding a housing 10 having a lens 20. The mold used in the injection molding process may include a sand-blasted or otherwise roughened portion corresponding to the dome 23, such that the roughened surface finish of the dome 23 is achieved during manufacture and injection molding of the housing 10; there is no post-molding process occurring to create the roughened surface finish. Alternatively, the roughened surface finish of the dome 23 may be finalized or otherwise tuned in post-molding processes (e.g., roughened from a SPI D1 roughness to a SPI D3 roughness post-molding). Similarly, the mold used in the injection molding process may include a polised portion corresponding to the lightpipe 21, such that the polished surface of the interior of the lightlight 21 is achieved during manufacture and injection molding of the housing 10.

Figure 7A:
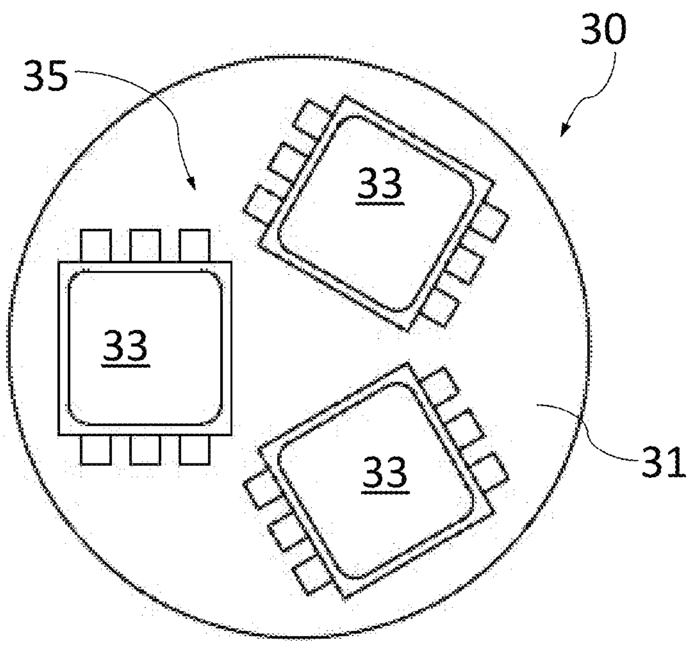
FIGS. 7A and 7B illustrate views of a printed circuit board (PCB) having a cluster of light-emitting diodes (LEDs) for use in track lighting systems, such as the track lighting system illustrated in FIG. 1.
Figure 7B:
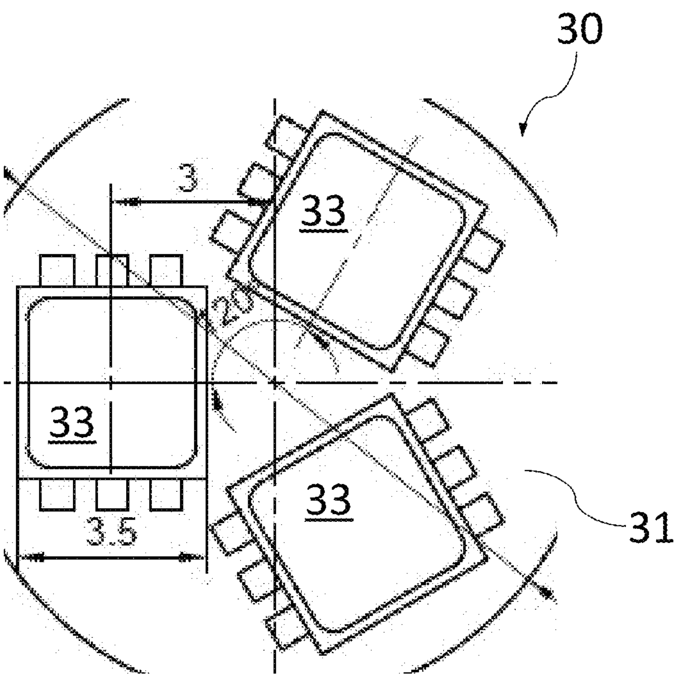
Figure 8:
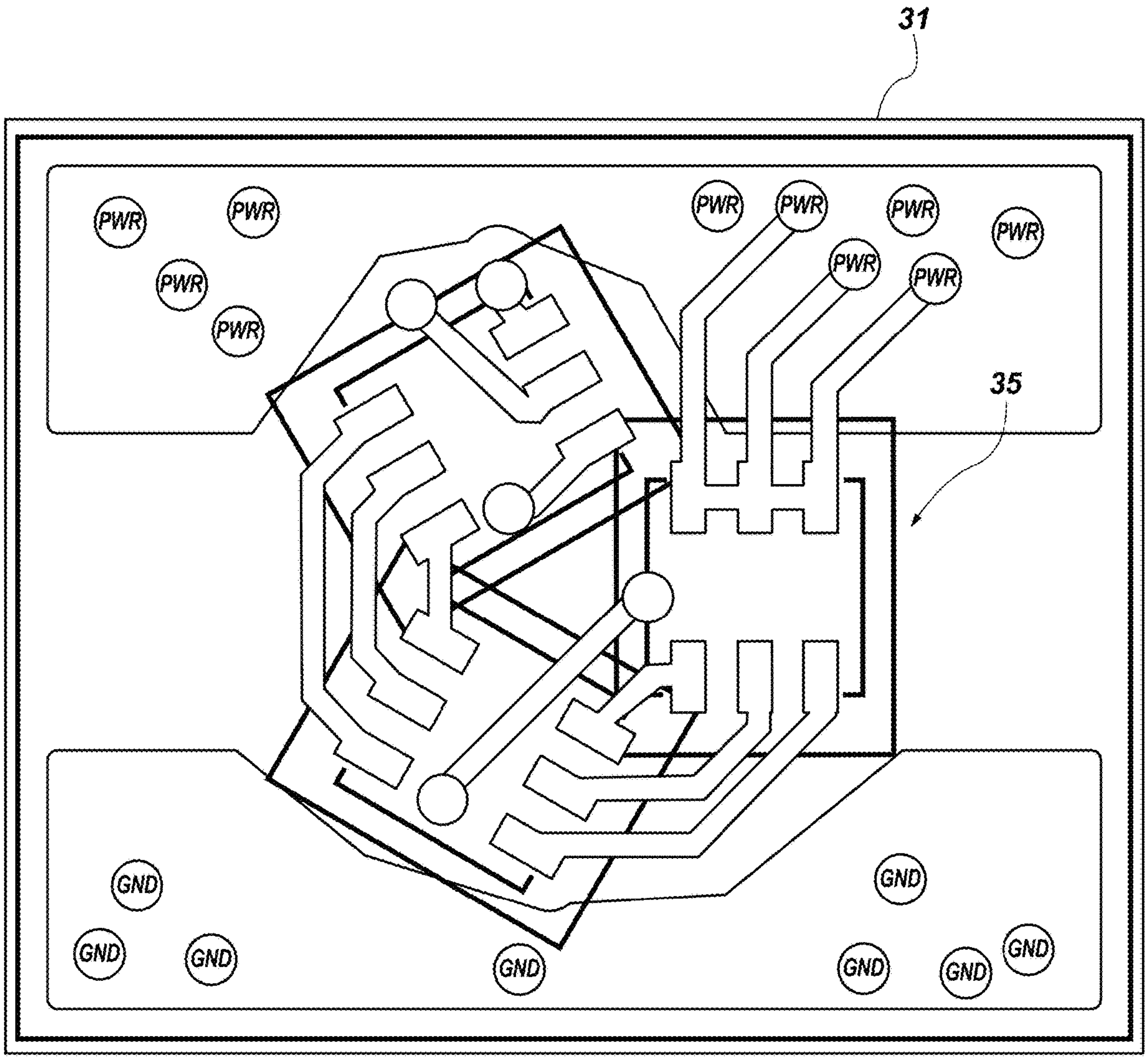
FIG. 8 illustrates a top view of the printed circuit board of FIGS. 7A and 7B, showing circuitry connections between the LEDs.
Figure 9:
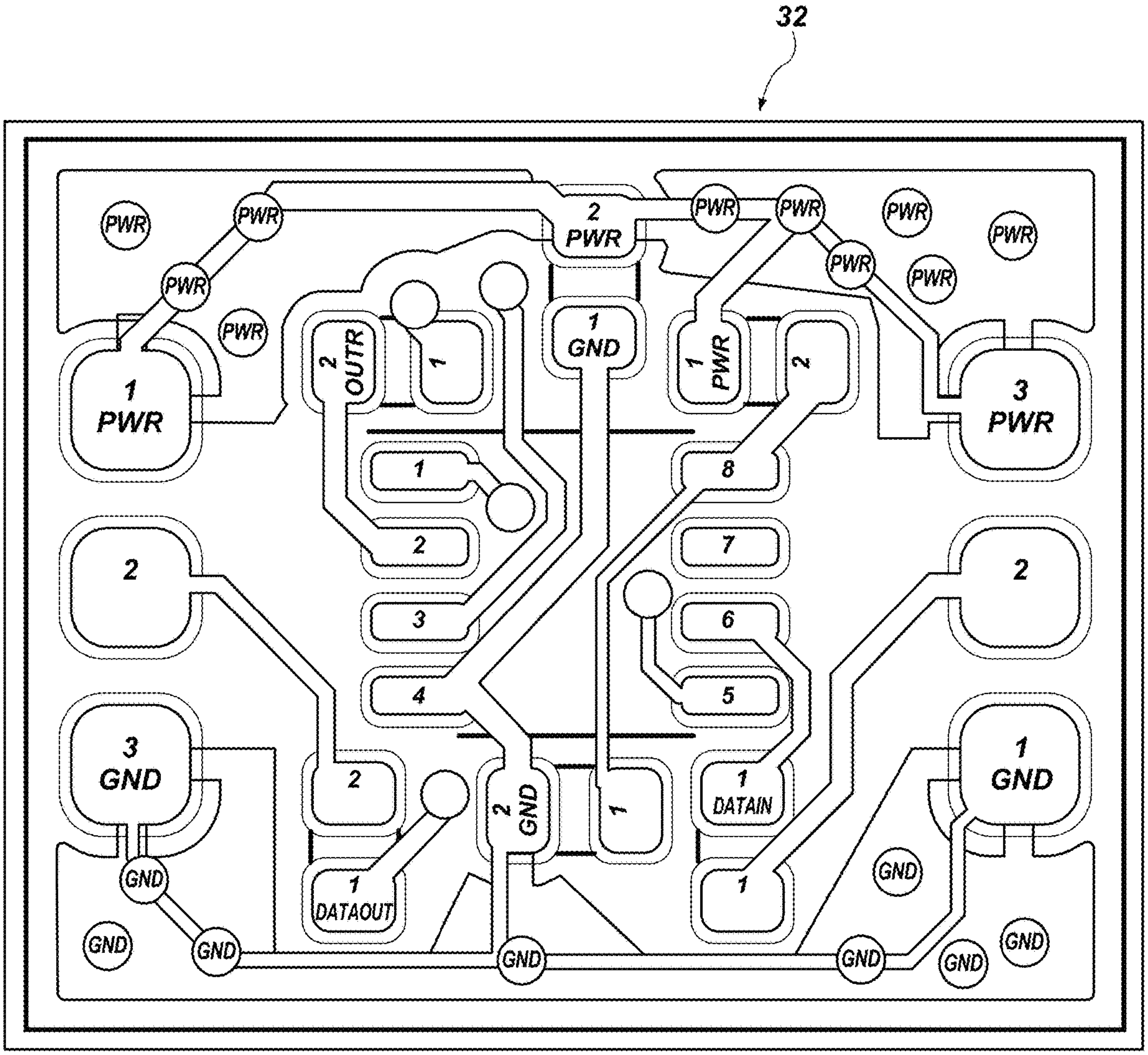
FIG. 9 illustrates a bottom view of the printed circuit board of FIGS. 7A and 7B, showing additional circuitry connections and electrical components.
Figure 10:
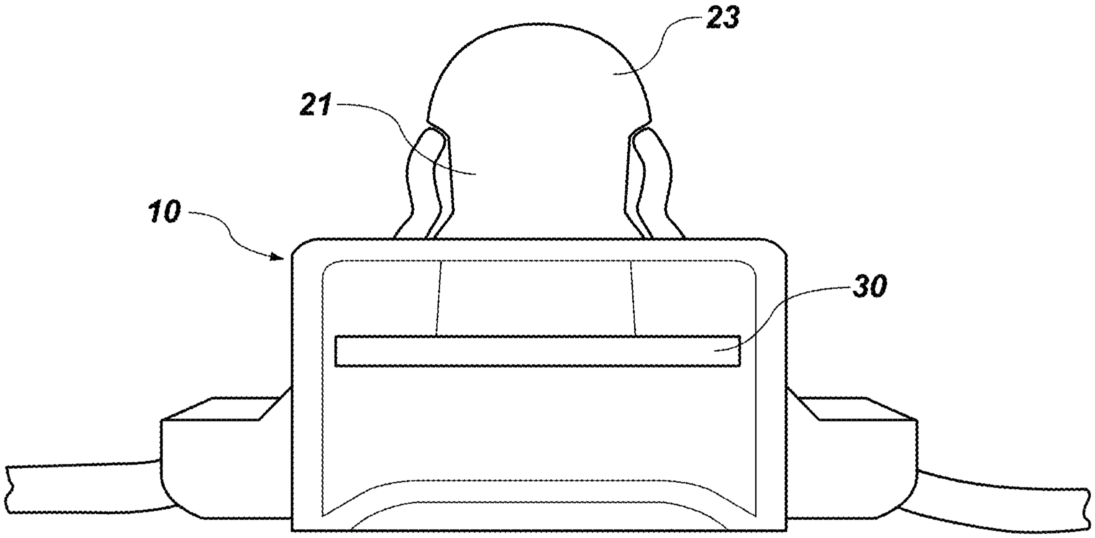
FIG. 10 illustrates the printed circuit board of FIGS. 7A through 9 received within the housing of FIGS. 3A through 6, thus creating the luminaire of FIG. 2.

FIGS. 7A and 7B illustrate views of a circuit board (e.g., a printed circuit board (PCB)) 30 having a cluster of light-emitting diodes (LEDs) 35 for use in track lighting systems, such as the track lighting system illustrated in FIG. 1. FIG. 8 illustrates a top view and FIG. 9 illustrates a bottom view of the printed circuit board of FIGS. 7A and 7B, showing circuitry connections between the LEDs. FIG. 10 illustrates the circuit board 30, carrying the cluster of LEDs 35, contained within the housing 10.

As illustrated in FIGS. 7A through 8, the circuit board 30 includes a cluster of LEDs 35 mounted to a top surface 31 of the circuit board 30. The circuit board 30 may also include a controller for controlling a color and emission of light from the cluster of LEDs 35. For example, the controller may receive instructions (e.g., a specific color or combination of colors, etc.) from an instructor and control the individual LEDs 33 to execute the instructions. The controller converts a digital signal received from the instructor to analog signals to control the LEDs 33.

The circuit board 30 also has a bottom surface 32 opposing the top surface 31 (FIG. 9). The bottom surface 32 may include various connections (e.g., power, network, I/O connections, etc.) as well as various modules (network, cloud, communications, etc.) for facilitating the operations of the circuit board 30 and control of the individual LEDs 33 and the cluster of LEDs 35.

The LEDs 33 may be RGB (red-green-blue) LEDs. Accordingly, the cluster of LEDs 35 may be controlled to output any desired color or combination of colors. In some embodiments, the LEDs 33 may additionally include white LEDs. The cluster of LEDs may include 3 individual LEDs 33 disposed on (e.g., soldered to, etc.) the top surface 31 such that the cluster of LEDs 35 forms an equilateral triangle. More LEDs may be used as desired. In the embodiment shown, each LED 33 may be rotated about 120° relative to an adjacent LED 33. In this way, the circuit board 30 is able to carry the LEDs 33 in a compact manner, while still providing a commercial grade brightness output. Placing this many LEDs 33 on a circuit board 30 was previously thought to be impossible. However, by angling the LEDs 33 such that they form an equilateral (or substantially equilateral) triangle, 3 LEDs can be clustered together on the top surface 31 of the circuit board 30. When the circuit board 30 is contained within the recess 17 of the housing 10, the cluster of LEDs 35 may be positioned under and aligned with the window 19 and, thus, the lightpipe 21.

For example, referring to FIG. 10, the circuit board 30 is received within the recess 17 of the housing 10, such that the circuit board 30 (e.g., a perimeter of the circuit board 30) abuts and is pushed up against the ledge 18. This positions the cluster of LEDs 35 underneath and aligned with the lightpipe 21, such that light emitted from the LEDs 33 is emitted into the lightpipe 21, into the dome 23, and out of the lens 20. A silicon or other appropriate filler is placed into any remaining space within the recess 17 and against a back of the circuit board 30 to secure the circuit board 30 within the recess 17. The silicon or other filler also serves as a heat sink for the circuit board 30 and the LEDs 33.

The LEDs 33 may be 35/35 LEDs (rather than 50/50 LEDs) and be directional.

For example, the LEDs 33 may have about a 40° broadcast of light (similar to a spotlight), such that the cluster of LEDs 35 may be capable of emitting light in about 180°. This directional emission of light from the LEDs 33, and thus the cluster of LEDs 35, allows light to illuminate the entirety of the lens 20 (e.g., the lightpipe 21, the dome 23, etc.).

Figure 11:
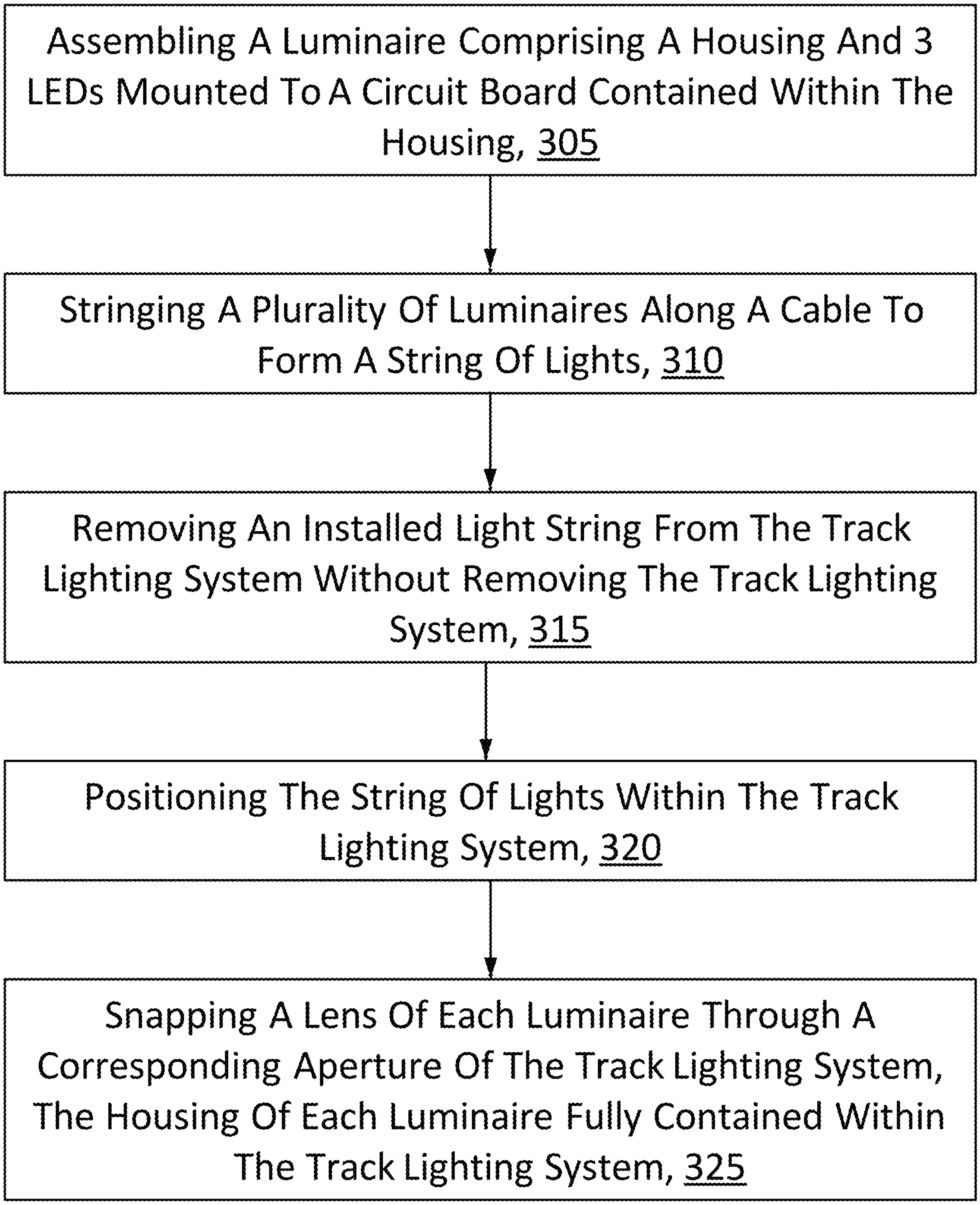
FIG. 11 is a flowchart of an example method for retrofitting a light, such as the luminaire of FIG. 2, within an installed track lighting system, such as the track lighting system of FIG. 1.

FIG. 11 is a flowchart of an example method 300 for retrofitting a light, such as the luminaire 100 of FIG. 2, within an installed track lighting system, such as the track lighting system of FIG. 1. The method 300 include assembling a luminaire having a housing and 3 LEDs mounted to a circuit board contained within the housing, at 305. The luminaire may be the luminaire 100 of FIG. 2, the housing may be the housing 10 of FIGS. 3A through 6, and the 3 LEDs may be mounted to the printed circuit board 30 of FIGS. 7A to 8.

The method 300 may also include stringing a plurality of luminaires along a cable to form a string of lights, at 310, and removing an installed light string from the track lighting system without removing the track lighting system, at 315. The method 300 may further include positioning the string of lights within the track lighting system, at 320. The method 300 may additionally include snapping a lens of each luminaire through a corresponding aperture of the track lighting system, the housing of each luminaire fully contained within the track lighting system, at 325.

The luminaire may be assembled by placing the circuit board within a recess of the housing such that a perimeter of the circuit board abuts a recess ledge. Assembly may also include positioning the 3 LEDs in light communication with the lens, such that light emitted from the 3 LEDs travels through and exits the lens. Further, assembly of the luminaire may include securing the circuit board within the recess with a quantity of silicon, the silicon acting as a heat sink for the circuit board. Positioning the string of lights within the track lighting system may include arranging the string of lights within a channel of the track lighting system and securing the cable within an overhang of the channel, thereby additionally securing the string of lights within the track lighting system.

In some embodiments, snapping a lens of each luminaire through a corresponding aperture of the track lighting system may include aligning a domed portion of the lens with the corresponding aperture of the track lighting system. Once aligned, the domed portion of the lens may be pushed or otherwise forced through the corresponding aperture of the track lighting system. Additionally, the corresponding aperture of the track lighting system may be engaged with wings flanking the lens, such that the wings secure the lens within the corresponding aperture of the track lighting system.

The string of lights may be removed by depressing the wings and pulling individual luminaires from their corresponding apertures of the track lighting system. Once each luminaire of the string of lights is removed from the corresponding apertures, the entire string can be pulled from the track lighting system.

Embodiments

Embodiment 1. A luminaire comprising a housing comprising having a body defining a recess having a ledge and a lens continuous with the body and extending away from the body; and a printed circuit board (PCB) housed within the recess, the PCB having a cluster of light-emitting diodes (LEDs), the cluster of LEDs including three (3) LEDs disposed in an equilateral triangle on a front surface of the PCB, and a controller for controlling the cluster of LEDs and receiving instructions from an instructor, the PCB abutting the ledge of the recess such that the cluster of LEDs are oriented towards the lens and emit light from the lens when the cluster of LEDs are powered.

Embodiment 2. The luminaire of Embodiment 1, wherein the cluster of LEDs comprise surface mounted diodes (SMDs).

Embodiment 3. The luminaire of Embodiment 1 or Embodiment 2, wherein the PCB comprises a rectangular shape.

Embodiment 4. The luminaire of any one of Embodiments 1 through 3, wherein each LED within the cluster of LEDs is rotated about 120° from an adjacent LED.

Embodiment 5. The luminaire of any one of Embodiments 1 through 4, further comprising a heat sink adjacent to a back surface of the PCB.

Embodiment 6. The luminaire of Embodiment 5, wherein the heat sink comprises a silicon filling, the silicon filling also anchoring the PCB within the recess of the housing.

Embodiment 7. The luminaire of claim any one of Embodiments 1 through 5, wherein the cluster of LEDs comprise RGB LEDs.

Embodiment 8. The luminaire of any one of Embodiments 1 through 5 or 7, wherein the cluster of LEDs comprise 40° directional LEDs, such that light emitted from the luminary has a 180° emission range.

Embodiment 9. The luminaire of any one of Embodiments 1 through 5 or 7 to 8, wherein the lens comprises a lightpipe and a flat-topped dome continuous with the lightpipe.

Embodiment 10. The luminaire of Embodiment 9, wherein the lens comprises solid polycarbonate.

Embodiment 11. The light of any one of Embodiments 1 through 5 or 7 to 9, wherein the controller controls a color output of the light based on instructions received from the instructor. Embodiment 12. The luminaire any one of Embodiments 1 through 5, 7 to 9, or 11, wherein the light can be retrofit into string lights installed within a track lighting system.

Embodiment 13. A housing for a light, the housing comprising a hollow body having a recess; a first tab extending from a first end of the hollow body; a second tab extending from a second, opposing end of the hollow body; a lightpipe extending from a top surface of the hollow body and in light communication with the recess; and a lens extending from the lightpipe along a longitudinal axis of the lightpipe, wherein the hollow body receives a printed circuit board (PCB) having a group of light emitting diodes (LEDs), such that light emitted from the LEDs bounces through the lightpipe, into the lens, and exits the lens such that light emitting through the lens appears to glow.

Embodiment 14. The housing of Embodiment 13, wherein the lens comprises a dome having an exterior surface finish and a flat apex.

Embodiment 15. The housing of Embodiment 14, wherein a diameter of the dome of the lens is greater than a diameter of the lightpipe along a horizontal axis of the lightpipe.

Embodiment 16. The housing of Embodiment 14, wherein the longitudinal axis of the lightpipe aligns with a longitudinal axis of the dome and the flat apex is along the longitudinal axis of the dome.

Embodiment 17. The housing of Embodiment 13 or Embodiment 14, wherein the lightpipe comprises a substantially rectangular body having a pair of curved side walls.

Embodiment 18. The housing of any one of Embodiments 13, 14, or 17 wherein the lightpipe comprises a polished surface finish.

Embodiment 19. The housing of any one of Embodiments 13, 14, 17, or 18, wherein the recess comprises a ledge for receiving the PCB such that the group of LEDs are aligned with the lightpipe.

Embodiment 20. The housing of any one of Embodiments 13, 14, or 17 to 19, wherein the housing further comprising a pair of wings extending from the top surface of the hollow body adjacent and opposingly disposed about the lightpipe.

Embodiment 21. The housing of any one of Embodiments 13, 14, or 17 to 20, wherein the pair of wings are for installing the housing within a track lighting system.

Embodiment 22. The housing of any one of Embodiments 13, 14, or 17 to 21, wherein the first tab and the second tab are for chaining the housing along a string of lights.

Embodiment 23. The housing of Embodiment 22, wherein the string of lights are installed within a track lighting system.

Embodiment 24. The housing of any one of Embodiments 13, 14, or 17 to 22, wherein the housing is injection molded as a unitary piece.

Embodiment 25. The housing of any one of Embodiments 13, 14, or 17 to 22 or 24, wherein the lens the lightpipe comprise a substantially solid, continuous structure.

Embodiment 26. A method of retrofitting lights within a track lighting system, the method comprising assembling a luminaire device comprising a housing and 3 LEDs mounted to a circuit board contained within the housing; stringing a plurality of luminaire devices along a cable to form a string of lights; removing an installed light string from the track lighting system without removing the track lighting system; positioning the string of lights within the track lighting system; and snapping a lens of each luminaire device through a corresponding aperture of the track lighting system, the housing of each luminary device fully contained within the track lighting system.

Embodiment 27. The method of Embodiment 26, wherein assembling a luminaire device comprises placing the circuit board within a recess of the housing such that a perimeter of the circuit board abuts a recess ledge; positioning the 3 LEDs in light communication with the lens, such that light emitted from the 3 LEDs travels through and exits the lens; and securing the circuit board within the recess with a quantity of silicon, the silicon acting as a heat sink for the circuit board.

Embodiment 28. The method of either Embodiment 26 or 27, wherein snapping a lens of each luminaire device through a corresponding aperture of the track lighting system comprises aligning a domed portion of the lens with the corresponding aperture of the track lighting system; pushing the domed portion of the lens through the corresponding aperture of the track lighting system; and engaging the corresponding aperture of the track lighting system with wings of the lens, such that the wings secure the lens within the corresponding aperture of the track lighting system.

Embodiment 29. The method of any one of Embodiments 26 to 28, further comprising tucking the cable of the string of lights into a storage channel of the track lighting system, thereby additionally securing the string of lights within the track lighting system.

Additional Terms and Definitions

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular luminaire (e.g., an housing with LEDs); however, other luminaires (e.g., bulbs, incandescent, fluorescent, etc.) are also contemplated.

In one embodiment, the terms "about" and "approximately" refer to numerical parameters within 10% of the indicated range. The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Although this disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed is:

1. A method of retrofitting lights within a track lighting system, the method comprising:

assembling a luminaire device comprising a housing and 3 LEDs mounted to a circuit board contained within the housing;

stringing a plurality of luminaire devices along a cable to form a string of lights;

removing an installed light string from the track lighting system without removing the track lighting system;

positioning the string of lights within the track lighting system; and snapping a lens of each luminaire device through a corresponding aperture of the track lighting system, the housing of each luminaire device fully contained within the track lighting system.

2. The method of claim 1, wherein assembling a luminaire device comprises:

placing the circuit board within a recess of the housing such that a perimeter of the circuit board abuts a recess ledge;

positioning the 3 LEDs in light communication with the lens, such that light emitted from the 3 LEDs travels through and exits the lens; and securing the circuit board within the recess with a quantity of silicon, the silicon acting as a heat sink for the circuit board.

3. The method of claim 2, wherein circuit board and the cable are secured within the recess of the housing.

4. The method of claim 1, wherein stringing a plurality of luminaire devices along a cable to form a string of lights comprises:

feeding the cable through a first tab of the housing of a first luminaire device;

securing the cable within the first tab by a clip;

feeding the cable through a second tab of the housing of the first luminaire device;

securing the cable within the second tab by a clip; and positioning a second luminaire device along the cable a distance from the first luminaire device.

5. The method of claim 4, wherein feeding the cable through a first tab of the housing of a first luminaire device comprises:

threading the cable through a channel defined by the first tab;

securing the cable underneath the clip; and passing the cable across a recess of the housing of the first luminaire device and to the second tab of the housing.

6. The method of claim 1, wherein snapping a lens of each luminaire device through a corresponding aperture of the track lighting system comprises:

pushing a dome of the lens through the corresponding aperture of the track lighting system; and anchoring wings of the lens within the corresponding aperture.

7. The method of claim 6, wherein the wings of the lens flank the dome of the lens.

8. The method of claim 6, wherein the dome and the wings extend through the corresponding aperture of the track lighting system.

9. The method of claim 6, wherein the dome and the wings extend through the corresponding aperture of the track lighting system, such that a planar apex of the dome extends through the corresponding aperture of the track lighting system.

10. The method of claim 1, wherein the housing of the luminaire device is a unitary piece.

11. The method of claim 1, wherein the LEDs comprise 40° directional LEDs, such that light emitted from the luminaire device has a 180° emission range.

12. The method of claim 1, wherein assembling the luminaire device comprises assembling a luminaire device comprising the housing and 4 or more LEDs mounted to a circuit board contained within the housing.

* * * * *